United States Patent [19]

Fischell

[11] 3,888,260

[45] June 10, 1975

[54] RECHARGEABLE DEMAND INHIBITED CARDIAC PACER AND TISSUE STIMULATOR

[75] Inventor: Robert E. Fischell, Silver Spring, Md.

[73] Assignee: The John Hopkins University, Baltimore, Md.

[22] Filed: Apr. 26, 1974

[21] Appl. No.: 464,441

Related U.S. Application Data

[63] Continuation-in-part of Ser. No. 267,114, June 28, 1972, abandoned.

[52] U.S. Cl........ 128/419 PG; 128/404; 128/419 P; 128/419 PS; 128/419 S; 128/421
[51] Int. Cl............................................. A61n 1/36
[58] Field of Search .. 128/419 EP, 419 PG, 419 PS, 128/419 S, 421, 422, 2.1 B, 2.1 R

[56] References Cited
UNITED STATES PATENTS

| | | | |
|---|---|---|---|
| 3,454,012 | 7/1969 | Raddi | 128/419 PG |
| 3,656,487 | 4/1972 | Gobeli | 128/419 PG |
| 3,662,758 | 5/1972 | Glover | 128/419 E |
| 3,667,477 | 6/1972 | Susset et al. | 128/419 E |
| 3,669,120 | 6/1972 | Nielsen | 128/419 PG |
| 3,683,932 | 8/1972 | Cole | 128/419 PG |
| 3,835,865 | 9/1974 | Bowers | 128/419 PG |
| 3,850,161 | 11/1974 | Liss | 128/419 S |

FOREIGN PATENTS OR APPLICATIONS

| 87,174 | 5/1966 | France | 128/419 |

*Primary Examiner*—William E. Kamm
*Attorney, Agent, or Firm*—Robert E. Archibald

[57] ABSTRACT

An improved demand inhibited cardiac pacer or human tissue stimulator employs a rechargeable battery to furnish operating power to electronic pulse generating circuitry which generates output stimulating pulses. For the demand inhibited cardiac pacer these pulses are generated only when the patient's heart stops beating properly at its own intrinsic rhythm as monitored by other circuitry in the pacer unit. A double hermetic sealing structure protects the electronic components of the pacer or tissue stimulator unit from exposure to corrosive fluids from the body and from the power source and additionally provides shielding against external electromagnetic interference, including protection of the electronic pulse generating circuitry from the alternating magnetic field that provides the recharging energy, but without significantly attenuating the inductive coupling of this recharging energy to the unit during the recharging operation. The demand inhibited pacer or tissue stimulator has an improved circuit design and provides accurate telemetry indication as to when such recharging of the unit's battery is taking place. Moreover, the proposed demand inhibited pacer includes transistor switching circuitry which functions to electrically connect the output of the pulse generating circuitry to the patient's heart only when an output pulse is being generated, in order to prevent the pulse generating circuitry from loading down the monitoring portion of the proposed pacer, and in certain configurations to reduce corrosion.

29 Claims, 4 Drawing Figures

Figure 1A:
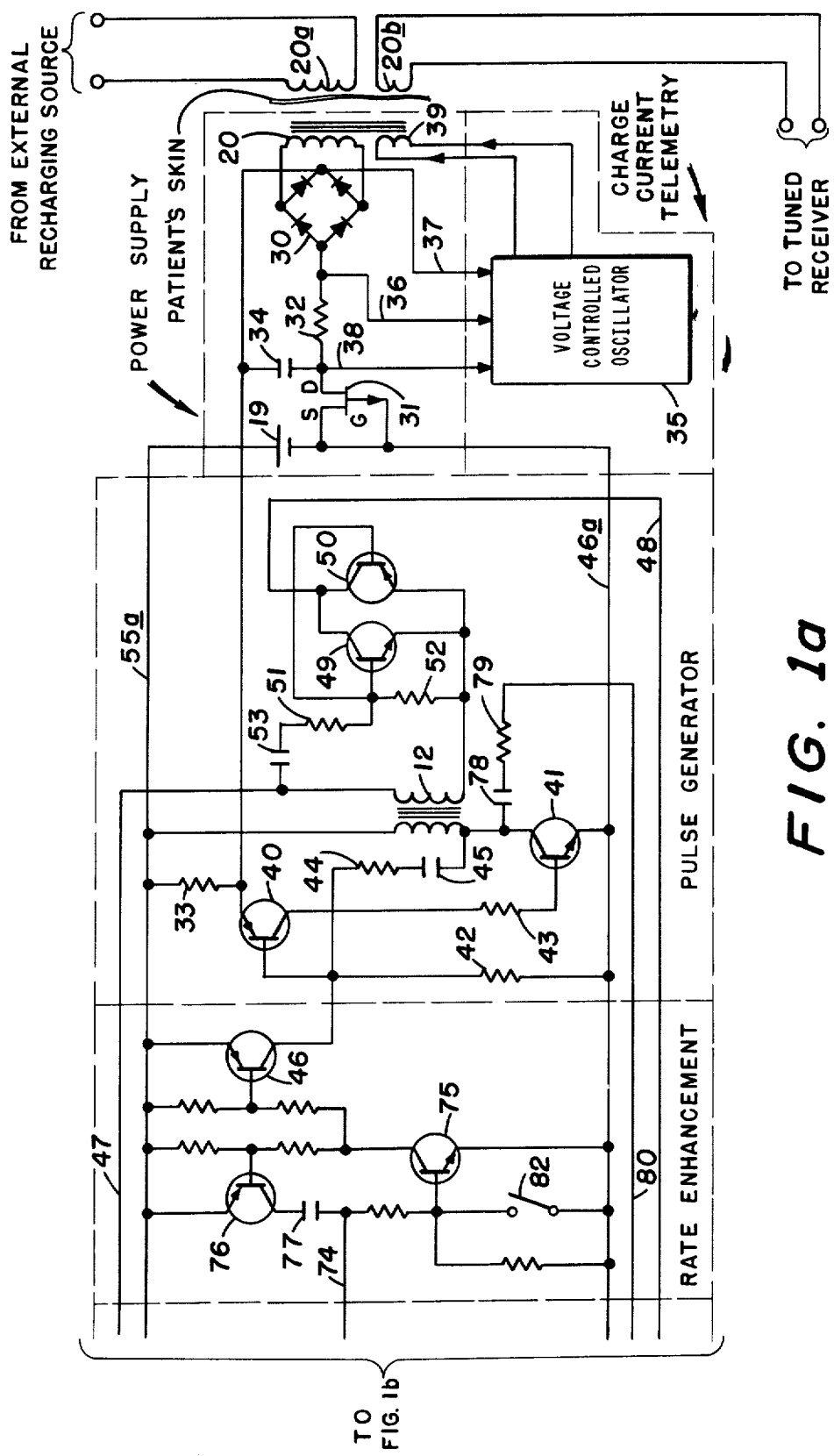

PATENTED JUN 10 1975　3,889,260
SHEET 2
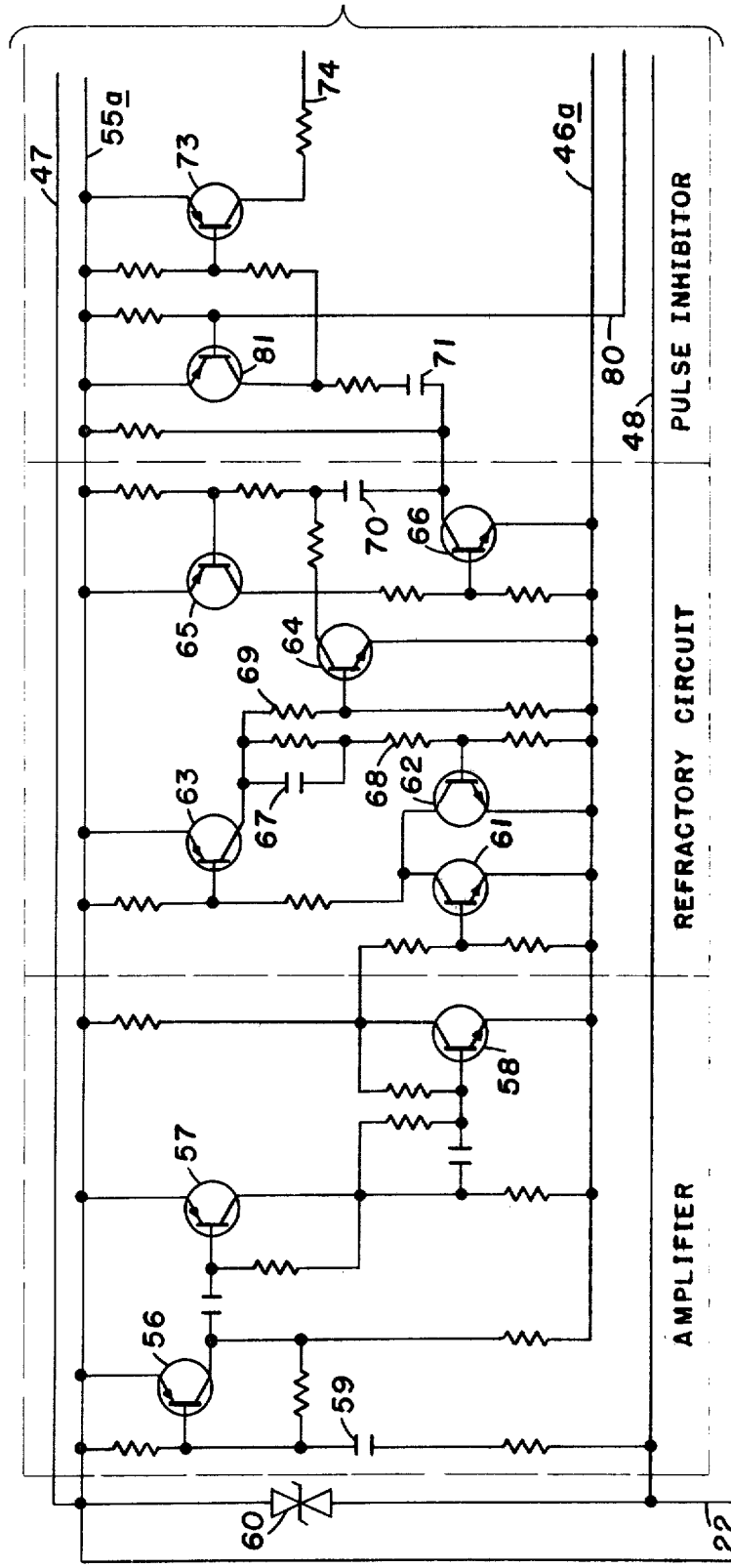
FROM FIG. 1a
FIG. 1b
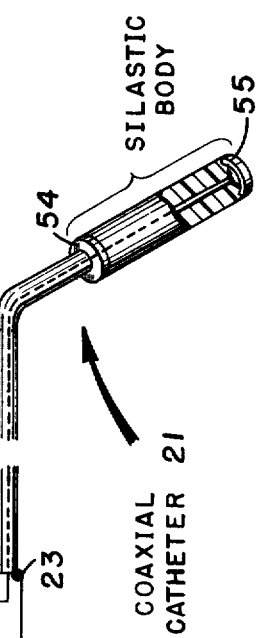

RECHARGEABLE DEMAND INHIBITED CARDIAC PACER AND TISSUE STIMULATOR

RELATED APPLICATION

This application is a continuation-in-part of my prior application, Ser. No. 267,114 filed June 28, 1972, now abandoned.

BACKGROUND OF THE INVENTION

A significant advance in the field of implantable cardiac pacers was recently developed and involved the utilization of a small, long-life secondary (i.e., rechargeable) single-cell battery to supply the operating power to hermetically sealed, fail-safe transistorized pulse generating circuitry capable of producing fixed rate, heart stimulating pulses for the patient. One example of such a rechargeable fixed rate cardiac pacer is disclosed in my copending patent application Ser. No. 154,492, filed June 18, 1971, which has the same assignee as the instant application.

It is well-known that many patients have a condition of heart block which necessitates occasional use of a cardiac pacer. In other words, the patient's heart will, at times, resume beating at its normal or intrinsic rhythm without any artificial stimulation. There is evidence that when this occurs, there are certain times during the heart's beating cycle when the simultaneous occurrence of a pacer pulse impressed on the heart can result in ventricular fibrillation and a high probability of death. Accordingly, the so-called demand inhibited pacer has been recently proposed to function in such a way as to preclude the generation of a pacer output pulse at the critical time when a heart is otherwise functioning normally. This is accomplished, in previously proposed demand inhibited pacer units, by monitoring the peak voltage pulse normally generated by the heart (called the R-wave) and when this natural pulse occurs, the pacer unit is inhibited from producing an output heart stimulating electrical pulse. If, on the other hand, the heart does not properly produce an R-wave signal output, the pacer unit is uninhibited and it therefore generates the output pulse necessary to stimulate ventricular beating at an acceptable rate.

The use of electrical stimulation of human tissue such as nerves, muscles and brain is also well known, e.g., see U.S. Patent to Keegan No. 3,083,712, and entitled "Device for Producing Electrical Muscle Therapy". A recent promising application of electrical stimulation of human tissue for the treatment of epilepsy, cerebral palsy and spasticity has also been described by Dr. I. S. Copper in an article entitled "Effect of Chronic Stimulation of Anterior Cerebellum on Neurological Disease," *Lancet*, 1:206, 1973. These tissue stimulators work in a manner very similar to cardiac pacers in that they provide electric periodic pulses by means of electrodes to stimulate tissue.

SUMMARY OF THE INVENTION

In accordance with the present invention, it is proposed to provide an improved rechargeable, demand inhibited pacer and tissue stimulator whose structural or mechanical design is such that it includes double hermetic sealing which not only functions to protect the internal electronic components from corrosive fluids from the body and the device's power source and provides an effective electromagnetic shield for the internal electronic components, but moreover accomplishes this latter function without severely attenuating the alternating magnetic field that is utilized to recharge the pacer or stimulator battery.

More specifically, in the illustrated embodiment of the present invention to be described in more detail hereinafter, the proposed device structure includes an outer shield or casing member which is comparatively transparent to the alternating magnetic field utilized to recharge the battery but is nonetheless an effective corrosive resistant hermetic seal against the infusion of corrosive body fluids, and moreover is compatible with the patient's body. On the other hand, in order to provide protection for the electronic circuitry of the unit and prevent such circuitry from having its functioning adversely affected by externally generated electromagnetic interference, including the relatively intense alternating magnetic field required for recharging the battery, the main body of the pacer or stimulator electronics is encompassed within a second or inner shield fabricated from a magnetically permeable and electrically conductive material which thereby forms an effective electromagnetic shield for the electronics. This second or inner shield also protects the electronics from a possible leakage of corrosive solutions from the battery. This is particularly essential for demand inhibited pacers since there have been many documented cases where externally generated electromagnetic interference such as, for example, radar, microwave ovens, or even ignition noise from automobiles, has caused such demand pacers to be inadvertently shut off; thereby resulting in patient mortality.

During the operation of rechargeable implantable pacers and stimulators it is desirable that an indication be provided to the patient and/or an attending physician as to when the unit is properly recharging. However, this telemetering capability has not been successfully provided with the demand inhibited pacer units heretofore proposed nor with tissue stimulators in general. In accordance with the present invention, therefore, the improved demand inhibited pacer or stimulator unit includes a novel telemetry system which provides an accurate indication as to when the rechargeable battery contained in the unit is undergoing proper recharging. The functioning of this telemetry system does not depend on whether or not the demand inhibited pacer is in its inhibited state.

A further improvement in the electrical design of the proposed demand inhibited cardiac pacer involves the inclusion of transistorized switching circuitry which functions to electrically connect and disconnect the output of the pulse generating circuitry to and from the coaxial catheter which, in addition to applying the output pulses from the pacer to the patient's heart, also picks up or monitors the electrical wave emanating from the heart when the heart beats and couples it back to the pacer unit for inhibiting purposes, if deemed appropriate. In particular, this switching circuitry functions to connect the output of the pulse generating circuitry to the catheter only when the pulse generating circuitry is outputting a heart stimulating pulse, so as to prevent the pulse generating circuitry from electrically loading the catheter and thereby prevent proper monitoring of the electrical wave generated by the patient's heart in response to each heart beat.

In view of the foregoing, one object of the present invention is to provide an improved mechanical structure for rechargeable cardiac pacers or stimulators and including double hermetic sealing/electromagnetic shielding applicable to both rechargeable fixed rate and demand inhibited pacers and to tissue stimulator units.

Another object of the present invention is to provide an improved mechanical structure particularly suited for rechargeable implantable demand inhibited cardiac pacers or tissue stimulators whereby the entire unit is contained in a double hermetic seal and the electronic components are electromagnetically shielded without significantly reducing the capability of the battery to be inductively recharged from an external alternating magnetic field source.

Another object of the present invention is to provide a rechargeable demand inhibited pacer or stimulator unit with improved electronic circuit design, including provisions to enable accurate monitoring of the proper battery recharging operation and to prevent the pulse generating circuit function from interfering with that portion of the circuitry which monitors the electrical wave generated by the heart during beating, for proper inhibiting control within the pacer unit.

Figure 3:
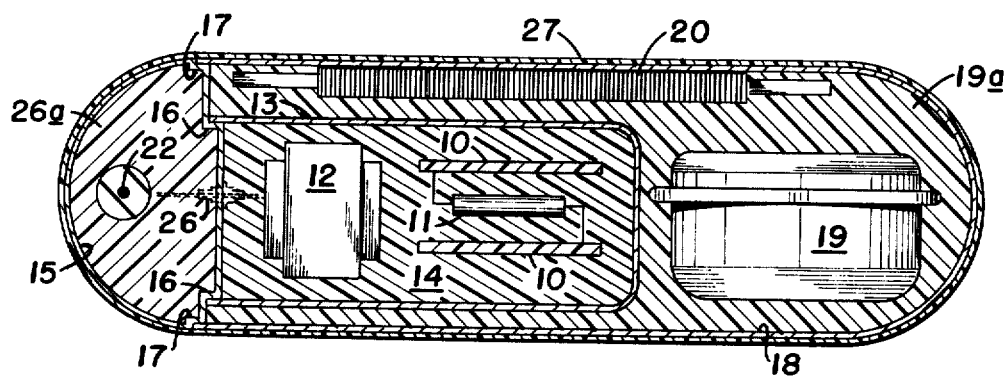
Figure 2:
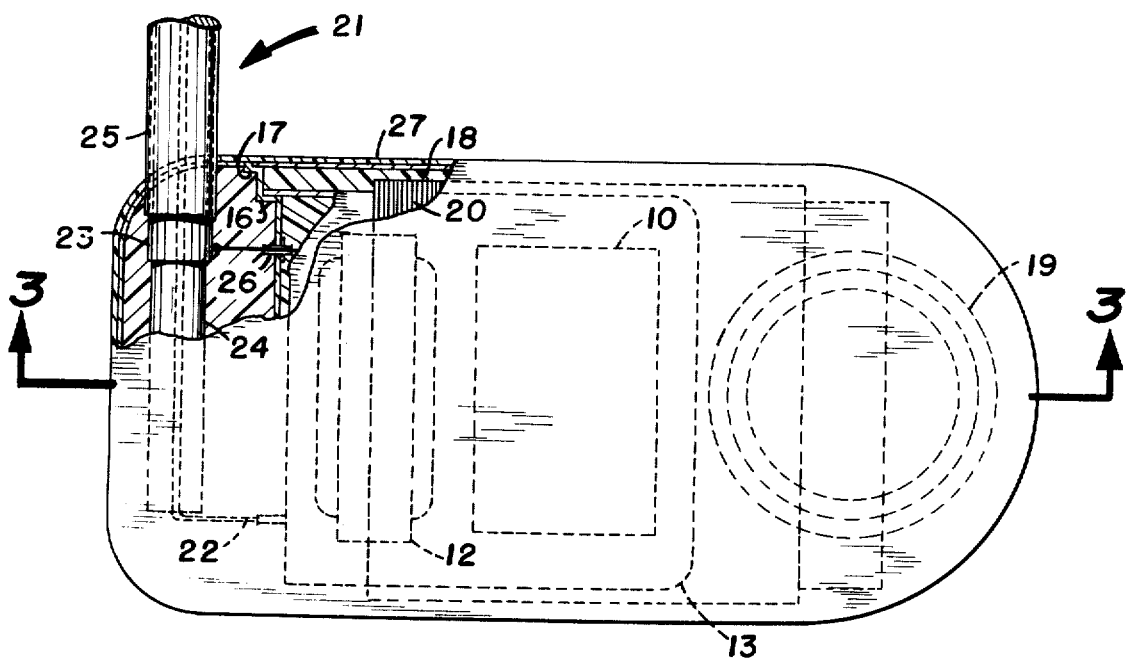

Other objects, purposes and characteristic features of the present invention will in part be pointed out as the description of the present invention progresses and in part be obvious from the accompanying drawings wherein:

FIGS. 1a and 1b, when placed end to end with FIG. 1a on the right, illustrates a schematic diagram of circuitry utilized in one embodiment of a rechargeable demand inhibited cardiac pacer according to the present invention;

FIG. 2 is a top view of the mechanical structure constituting one embodiment of the proposed demand inhibited cardiac pacer unit, with a portion broken away to illustrate one manner of connecting the coaxial catheter element to the pacer unit and also one manner of hermetically sealing the unit; and FIG. 3 is a cross-sectional side view of the pacer unit of FIG. 2, taken along line 3—3 in FIG. 2 and viewed in the direction of the arrows.

The mechanical structure and electrical design of the rechargeable demand inhibited cardiac pacer is essentially identical to that which could be used for any rechargeable human tissue stimulator. For that reason, I shall herein only describe the design of the rechargeable demand inhibited cardiac pacer with the understanding that the features described apply equally well to a rechargeable human tissue stimulator.

More specifically, the mechanical structure of the illustrated rechargeable demand inhibited pacer unit will first be described, with particular emphasis on the double hermetic seal/electromagnetic shielding structure proposed in accordance with the present invention; i.e., (a) an outer hermetic seal or casing which precludes the degrading influence of body fluids which could corrode the electronic components of the pacer unit but which is also purposely designed to not severely attenuate the alternating magnetic field that is necessary to recharge the pacer battery and (b) a second or inner casing which forms a second hermetic seal and also an effective shield to protect the pacer from electromagnetic interference, including the intense alternating magnetic field required for recharging of the battery, and from possible leakage of corrosive solutions from the battery.

In FIGS. 2 and 3 of the drawings, the electronics portion of the illustrated embodiment of the proposed rechargeable demand inhibited pacer unit is diagrammatically illustrated by two printed circuit boards 10 with an interconnected circuit component 11 and would include, for example: the pulse generating circuitry which produces the output heart stimulating pulses; the above-described transistor switching circuitry; the recharging circuitry and the associated telemetry circuits which monitor the recharging operation; and, the circuitry which amplifies and shapes the heart-emanating electrical wave (the so-called R-wave signal) and utilizes it to inhibit the pacer when the patient's heart is beating naturally at an acceptable rate. This electronic circuitry is shown in schematic form in FIGS. 1a and 1b and its operation will be described in more detail hereinafter.

The electronics 10–11 and a suitable output transformer 12 are contained in a hollow, substantially rectangular can or casing formed of a metal which is, ideally, both highly magnetically permeable and electrically conducting (resistivity typically less than 10 micro-ohms centimeters) and whose walls are relatively thick (thickness greater than approximately 5 mils); so as to effectively shield the electronic circuitry 10–11 against externally generated electromagnetic interference, including the intense alternating magnetic field required for recharging, and also resist corrosive attack from the leakage of battery electrolyte.

By way of example, the inner casing or can 13 could be fabricated from a material such as pure nickel, 10 to 20 mils thick and having a magnetic permeability of between 1,000 and 10,000. Alternatively, a material which is only highly conducting, such as pure gold (resistivity 2 $\mu\Omega$ - cm) would also be satisfactory for the inner hermetic seal/electromagnetic shield 13 if it is sufficiently thick; e.g., typically ten mils or more.

During fabrication of the proposed pacer unit, the electronic circuitry 10–11 and the output transformer 12 would be mounted within the inner can 13 and the can 13 then filled with a suitable encapsulation compound 14 such as, for example, silicon rubber of the well-known medical Silastic compound type. Subsequently, the open end of the can 13 is covered with a suitably configured end cap member 15, also preferably formed of a magnetically permeable and electrically conductive material such as pure nickel. More specifically and as is shown in FIG. 3 of the drawings, the end cap 15 is formed with a suitable rectangular shoulder 16 adapted to mate with and seal the open end of the metal can 13. The cap 15 would be connected permanently to the can 13 by electron beam welding, for example, around the shoulder 16 in order to effect a hermetic shield.

The metal end cap 15 is also formed with an outside rectangular shoulder 17 adapted to mate with and seal an outer hollow can or casing 18 which is generally rectangular with rounded corners and edges and which is fabricated of a thin-walled material such as five to ten mil thick stainless steel having negligible magnetic permeability (e.g., less than 2) and a relatively high electrical resistivity (e.g., between 50 and 100 micro-ohm centimeters). As discussed previously, the primary purpose of this outer casing or can 18 is to hermetically seal the over-all pacer unit from the infusion of body fluids which could have a corrosive effect particularly on the electronic components of the pacer unit. On the other hand, because this outer can 18 is not magnetically permeable, is thin-walled and is electrically resistive, it also is comparatively transparent; i.e., causes low attenuation, to the magnetic field used to recharge the pacer battery, as will be described hereinafter. The outer casing 18 may also be fabricated of other thin (thickness range approximately 3–20 mils) metal such as titanium or the alloy designated Haynes 25. A glass, ceramic, or other non-conducting non-permeable hermetic seal envelope for the outer casing 18 would also be totally satisfactory even with a considerably greater thickness (maximum thickness approximately 50 mils), because these materials are not all electrically conductive or magnetically permeable.

The outer can casing 18 is also open at one end and is adapted to receive and be sealed at the outer shoulder 17 of the end cap 15, for example, by electron beam welding to effect a hermetic seal. Obviously, however, before end cap 15 is secured to outer can 18, the rechargeable battery shown at 19 would be mounted within the outer can 18, along with the input transformer 20, and then be suitably encapsulated therein by means of a medical Silastic compound or the like 19a. By way of example, the battery 19 might be a single cell, nickel-cadmium battery capable of producing a nominal 1.25 volts with a capacity of 200 milliamp-hours. The input transformer 20, on the other hand, would preferably be in the form of a substantially flat sheet or core of suitable magnetically permeable (e.g., ferrite) material surrounded by a multi-turn insulated winding. As shown in FIG. 3, the transformer 20 might be attached; e.g., by gluing, to the upper inner surface of the outer casing member 18.

The end cap unit 15 is also formed with a suitable opening (located at the upper left-hand corner of the unit in FIG. 2) adapted to provide a lead-in connection from the pacer unit to a conventional coaxial catheter element generally designated at 21. The catheter unit 21 is formed, as is well-known, with a central conductor element 22 surrounded by an outer conductor sleeve member 23; the coaxially-disposed conductor elements 22–23 being separated from one another by a suitable electrical insulator material 24. The catheter unit 21 also has an outer electrical insulating shield such as is represented at 25 and formed, for example, of a material such as medical Silastic compound.

The conductor elements 22–23 of the catheter unit are connected electrically to the internal electronic circuitry of the pacer unit, as will be described in detail hereinafter, and such connection is accomplished by means of a pair of suitable Kovar lead-through elements mounted in the end cap 15; one of which is illustrated in FIGS. 2 and 3 at 26. These lead-through units 26 enable electrical connection to be made between the catheter 21 and the electronics without destroying the hermetic seal formed between the end cap and the inner shield can 13. The end cap 15 is also preferably filled with a suitable potting material 26a which not only functions as an electrical insulator but also aids in hermetically sealing the unit and protecting it from mechanical shocks.

To make the proposed pacer unit more acceptable for human implantation, the entire pacer unit, after fabrication, is preferably provided with a continuous coating 27 of suitable plastic material; e.g., medical Silastic and/or epoxy resin, in single or multiple layers, which serves to prevent corrosion of the outer metal case and also reduce irritation of the patient's body tissues. Moreover, in order to miniaturize the pacer uint and, at the same time, accomplish the desired hermetic sealing of the electronic circuitry 10–11, such circuitry can, if desired, be fabricated in accordance with well-known hybrid circuit fabrication techniques; i.e., the circuitry 10–11 can be produced within a sealed metal can or container which itself functions as a hermetic seal/electromagnetic shield for the circuitry.

In summary, the mechanical design of the proposed cardiac pacer includes an outer hermetic seal (the wall 18) which is fabricated from a material possessing very high electrical resistivity and negligible magnetic permeability and has suitable corrosion resistant characteristics which function to preclude the possibility of body fluids diffusing into the pacer and destroying the internal electronics such as the input transformer 20, the output transformer 12 and the circuitry 10–11. On the other hand, because this outer hermetic seal 18 is thin-walled and electrically resistive, it does not appreciably attenuate the periodic magnetic recharging signal impressed upon the input transformer 20 during recharging operation. The inner casing 13 is, conversely, made of a material which is highly conducting and magnetically permeable to form an inner hermetic seal which also functions to shield the output transformer 12 and the electronics 10–11 against electromagnetic interference due to the high energy recharging source field and any external radio frequency sources such as those noted hereinabove.

Having described the mechanical structure of the illustrated embodiment of the proposed rechargeable demand inhibited pacer unit, attention will now be turned to the electronic circuitry illustrated in FIGS. 1a and 1b of the drawings. As will be described in more detail hereinafter, this circuitry functions to generate output heart stimulating pulses under the control of circuitry which monitors the patient's heart beat and inhibits the generation of the heart stimulating pulses when the patient's heart is beating naturally at an acceptable intrinsic rate.

Referring now to FIG. 1a of the drawings, electrical power for the electronic circuitry of the proposed pacer unit is provided by the single cell rechargeable nickel-cadmium battery represented at 19. The battery 19 is maintained in an acceptable operating condition by recharging energy inductively coupled through the patient's skin from a suitable external source of recharging energy by means of the ferrite core input transformer 20 and the illustrated recharge head 20a, as described for example in my copending application Ser. No. 154,492, filed June 18, 1971. The input recharging energy developed across the illustrated upper secondary winding of the input transformer 20 is rectified at the conventional full-wave diode bridge rectifer 30. The output recharging current available at the diagonals of the rectifier 30 is applied to the battery 19 through a series recharging circuit comprising a conventional field effect transistor current limiter 31, current monitoring resistor 32, and a small (e.g., 3 ohm) voltage drop resistor 33. A filter capacitor 34 is connected across the output of the full-wave rectifier 30 between one output terminal of the resistor 30 and the point at which the drain element of field effect transistor 31 is connected to the current monitoring resistor 32.

A voltage controlled oscillator 35 of conventional design is connected by wires 36 and 37 to receive operating supply voltage from the output of the fullwave rectifier bridge 30. This oscillator 35 is also connected, via wires 36 and 38, to receive a control voltage signal developed across the current monitoring resistor 32. As a result, the output frequency generated by the oscillator 35 varies in accordance with the value of recharging current being supplied to the battery 19. For example, in one practical embodiment of the present invention, the voltage controlled oscillator 35 is designed to generate an output frequency of 10 kilohertz at a preselected saturation charge current of 40 milliamps. The output frequency telemetry signal from the oscillator 35, when detected by a suitable external receiving unit (not shown) via the winding 20b, thus provides accurate indications both that recharging is taking place and the precise value of the recharging current. By way of example, the output of oscillator 35 could be coupled to a separate winding 39 on input transformer 20 whereby it is inductively coupled to the external receiver. In this manner, the input transformer 20 would serve the dual purpose of coupling recharging energy to the pacer and coupling the telemetry signal from the pacer unit to the external receiver.

The small value resistor 33 connected in the recharging circuit to the battery 19 also functions to permit external monitoring of the recharging operation, as is fully described in my copending application Ser. No. 154,492. Briefly, voltage drop developed across the resistor 33 during recharging has the effect of decreasing the interpulse period and thus increasing the output pulse rate produced by the pulse generating circuitry. This, in turn, enables the patient and/or the attending physician to detect that recharging is taking place by merely noting this increase in the patient's pulse rate.

The pulse generating circuitry employed in the illustrated embodiment of the proposed rechargeable demand inhibited pacer comprises transistor pair 40–41 which, together with resistors 42, 43, and 44, timing capacitor 45, and output transformer 12, forms a conventional relaxation type oscillator circuit essentially the same as that described in detail in my copending application Ser. No. 154,492.

More specifically, assume that transistors 40 and 41 are both initially nonconducting and that transistor 46 in the designated rate enhancement circuitry (to be described in detail hereinafter) is also turned off. The timing capacitor 45 will therefore charge through the primary winding of the output tansformer 12 and resistors 44 and 42; the resistor 42 having a relatively large value (e.g., 1.2 megohms) compared with the resistor 44 (e.g., 470 ohms). This charging current through resistor 42 maintains transistor 40 in its non-conducting state until such time as capacitor 45 has charged up to a predetermined level, at which time transistor 40 turns on and, by regenerative feedback, transistor 41 is also rendered conductive. With transistors 40–41 conducting, one side of the capacitor 45 (the lower side in FIG. 1a) is connected to the negative supply line 46a; whereas, the other side of this capacitor is connected through the base-emitter junction of transistor 40 and resistor 33 to the positive terminal of the battery 19. This condition lasts as long as the primary winding of the output transformer 12 can sustain the supply voltage; e.g., in one practical embodiment of the illustrated pacer circuitry, this time interval is preselected at one millisecond. Subsequently, the primary of the output transformer 12 saturates and the transistor 41 can no longer conduct sufficient current to maintain its collector at ground. Therefore, the current through capacitors 45 decreases and turns off transistor 40 which, by regenerative feedback, turns off transistor 41 and the circuitry is now ready for a pulse generating cycle.

As a result, the illustrated pulse generating circuitry will, unless inhibited, generate a series of positive-going trigger pulses across the secondary of the output transformer 12, each pulse being approximately 5 volts in amplitude and having a 1 millisecond pulse width. The action of the output transformer 12 also causes each output heart stimulating pulse from the pacer to have a negative-going portion of approximately the same area as the positive-going heart triggering pulse portion, in order to minimize the net ion flow in the blood near the catheter electrodes (to be described). A typical pulse repetition rate for the pulse generating circuitry, as determined primarily by resistor 42 and capacitor 45, would be 72 pulses per minute.

One side of the secondary winding of output transformer 12 is connected directly to the outer conductive sleeve 23 of the coaxial catheter of FIG. 1b via wire 47; whereas, the other end of the output transformer secondary is connected to the center or inner catheter conductor 22 by means of wire 48 and a series connected transistorized bipolar switching circuit of conventional design and comprising transistor pair 49–50 and resistances 51 and 52. A D.C. isolation capacitor 53 is interposed between the output transformer 12 and the bipolar switching circuitry 49–50 in order to prevent the inadvertent application of battery potential directly to the patient's heart.

The output switching gate formed by transistor pair 49–50 is closed only when an output pulse appears at the secondary of the output transformer 12 for application to the patient's heart. More specifically, during the positive portion of the output pulse from the pulse generating circuitry, the transistor stage 49 conducts to connect the output transformer 12 to the output line 48; whereas, during the negative portion of the output heart stimulating pulse the other transistor 50 conducts. At all other times, this switching circuit 49–50 is open and maintains a high impedance input to the heart beat monitoring circuitry to be described in more detail hereinafter. In other words, the transistorized gate 49–50 is connected electrically in parallel with the monitoring circuitry so that if this switching gate were not provided, the low impedance represented by the output transformer 12 would have the effect loading down the heart beat output pulse and thereby prevent proper monitoring thereof.

As noted earlier, the output heart stimulating pulses from the pulse generating circuitry just described are applied to the patient's heart by means of the conventional coaxial catheter 21 shown in FIG. 1b. The catheter 21 terminates at a proximal electrode element 54 which is connected electrically to the outer catheter conductor member 23 and output line 47, and a distal electrode element 55 which is connected electrically to the inner catheter conductor 22 and output line 48. It should be noted here that the output line 47 is preferably not connected to the positive supply voltage line 55a adjacent the positive terminal of the battery 19 but, instead, is connected to this supply voltage line physically close to the catheter and beyond the transistorized circuitry which receives its operating voltage from the battery 19, in order to minimize the effect on such circuitry of the output current surges. This is represented, in FIGS. 1a and 1b, by extending line 47 from FIG. 1a to FIG. 1b prior to connecting it to positive supply line 55a.

Having described how the output heart stimulating pulses are generated, attention will now be turned to that portion of the circuitry which monitors the electrical pulse emanating from the heart as a result of heart beat and which utilizes this monitored pulse to inhibit the pulse generating circuitry when the heart is beating at an acceptable normal or intrinsic rate.

More specifically, the coaxial catheter 21 is positioned in the heart such that it not only properly applies the heart stimulating pulses from the pacer unit to initiate paced beating of the heart, but the electrical signal generated in the heart upon beating is also sensed across the electrodes 54–55 and appears at the input to a conventional three stage cascade amplifier comprising transistor stages 56, 57, and 58. This heart-generated signal comprises the so-called "QRS-T complex" which is synchronous with ventricular contraction; i.e., such contraction beginning with the onset (leading edge) of the Q-wave and ending with the decline (trailing edge) of the T-wave.

Typically, as applied through coupling capacitor 59 to the base of the first amplifying transistor stage 56, the input R-wave portion of the heart's signal has a value of at least 3 millivolts. The three stage amplifier circuitry 56–58 is designed with a combined gain of approximately 200 so that the amplifier output contains an approximate 600 millivolt positive-going pulse level demarcating the occurrence of the R-wave portion of each beat of the patient's heart. A dual polarity Zener diode circuit 60 is connected across the coaxial catheter 21 at the input to the pacer circuitry for the purpose of protecting both the output switching transistors 49–50 and the input amplifier transistor stages 56–58 against any relatively high signal which might be present on the catheter, for example, when the heart is being defibrillated by an external shock defibrillation machine. In one practical application of the proposed circuitry, the Zener diode circuitry 60 is preselected to limit the input voltage level to a nominal 10 volts.

The amplified version of the heart beat signal appearing at the collector of the final amplifier stage 58 is applied to so-called refractory circuitry comprising: transistor stages 61, 62 and 63 which together form a conventional detector/one-shot circuit; switching transistor 64; and, transistor pair 65–66 which forms a second conventional one-shot. The general function of this refractory circuit is to prevent the pacer from being inhibited by a high level T-wave which may appear in the heart's output signal reasonably close in voltage level to the preceding R-wave; i.e., it is desirable that the pacer circuitry be inhibited only by the R-wave. Since the T-wave always appears in less than 300 milliseconds after an R-wave, the refractory circuit performs this function by essentially turning off or rendering ineffective the pulse inhibiting circuit portion of the pacer (see right-hand circuit portion of FIG. 1b) for an interval slightly longer than 300 milliseconds after each occurrence of a detected R-wave.

More specifically, the detector/one-shot transistor stages 61, 62 and 63 are normally all nonconducting. Transistor stage 61 is designed to turn on or conduct when the amplitude of the input pulse signal thereto exceeds a preselected (e.g., approximately 600 millivolts) threshold level indicative of the occurrence of an R-wave. With transistor 61 turned on, transistor 63 is also rendered conductive and provides a base current path for transistor stage 62, thereby also turning this latter transistor on. Transistor 62 being on maintains transistor 63 conducting for a fixed time interval after the input signal disappears from the base of transistor 61. This interval for which transistor 63 is maintained conducting is determined by the values of the RC timing circuit provided by capacitor 67 and series-connected resistor 68. By way of example, the capacitor 67 might have a value of 0.1 microfarads and the resistor 68 a value of 220 kilohms, to fix the interval for which transistor 63 is maintained on at approximately 100 milliseconds and thereby compensate for any variation in the width of the input R-wave signal. Thus, at the output (collector) of the transistor 63 appears a 100 millisecond wide positive-going pulse approximately 1 volt in amplitude for each normal R-wave generated by the heart and picked up at the coaxial catheter 21.

This pulse output from the transistor stage 63 is applied to the base of the switching transistor 64, through current limiting resistor 69, and is effective to trigger transistor 64 to a conductive condition wherein the timing capacitor 70, connected between the base and collector of one-shot transistors 65 and 66 respectively, is reset or discharged. Moreover, the transistor stage 65 now conducts and this, in turn, causes the other transistor 66 in this one-shot pair to also turn on, thereby holding transistor stage 65 in a conductive condition (after switching transistor 64 turns off to remove the reset) until the timing capacitor 70 charges sufficiently to turn off transistor stage 65 and, by regenerative feedback, transistor stage 66. The RC timing parameters for the one-shot 65–66 are preselected so that it takes approximately 200 milliseconds after transistor 64 turns off for capacitor 70 to charge sufficiently to revert transistors 65 and 66 to their normal cut-off condition. As a result, the output pulse from the one-shot 65–66 (at the collector of transistor stage 66) is a negative-going rectangular pulse whose leading edge demarcates the start of each input R-wave and having a width of approximately 300 milliseconds, representing the sum of (a) the 100 milliseconds during which the one-shot 65–66 is maintained in its reset condition by switching transistor 64 and (b) the 200 milliseconds one-shot period. This 300 milliseconds one-shot output pulse appearing at the collector of transistor 66 will stay on beyond 300 milliseconds for as long as pulses or signals less than 300 milliseconds apart continue to be detected. In this example where 300 milliseconds is used, all signals with a rate greater than 200 beats per minute (BPM); that is, 60 sec./min. divided by 300 msec. = 200 BPM, will keep the one-shot on. Also, if the T-wave is detected but occurs less than 300 milliseconds after the R-wave, this circuit will prevent the pacer from being inhibited by the T-wave. It will be shown below that the pacer is only inhibited when transistor 66 turns on (i.e., by the leading edge of the pulse that appears at the collector of 66). Thus, after the first pulse, all spurious signals appearing on the catheter with rates greater than 200 BPM (in this example) will not inhibit the pacer. This provides the pacer circuitry with significant noise immunity, and by adjusting the one-shots 62–63 and 65–66 the noise immune frequency range can be varied.

The 300 millisecond negative-going output pulse from the one-shot appearing at the collector of transistor stage 66 is applied, through a differentiating circuit formed of capacitor 71 and the series-connected resistances, to the base of transistor stage 73 (in the illustrated pulse inhibitor) where the resulting negative pulse demarcating the leading edge of the one-shot output and the start of the R-wave momentarily turns on or triggers transistor 73. As a result, a positive-going pulse signal appears at the collector of transistor 73 and is coupled, via line 74 between FIGS. 1a and 1b, to the base of transistor 75 which together with transistor 76 forms another conventional one-shot multivibrator circuit.. This triggers transistors 75 and 76 into conduction and the timing capacitor 77 begins to charge. Subsequently, at a preselected charge level, the base of transistor 75 reaches a condition wherein transistor 75 and transistor 76 are both returned to their normal nonconductve state.

The one-shot output signal appearing at the collector of transistor stage 75 as a result of this operation is a negative-going square wave pulse approximately 500 milliseconds in duration which is applied to and controls conduction of the transistor stage 46. As will be described in detail hereinafter, the transistor stage 46 is rendered conductive during the width of the 500 millisecond output pulse from the one-shot 75–76 and is effective, during this interval, to reset or discharge the timing capacitor 45; thereby inhibiting the pulse generating circuitry of the pacer.

That portion of the illustrated pacer circuitry containing the transistor stages 75, 76 and 46 thus functions to determine if and when the inhibiting control should be applied to or removed from the pulse generator circuitry. Generally speaking, the pulse generator is inhibited as long as the patient's heart is beating normally at an acceptable rate; e.g., between 60 and 180 beats per minute.

More specifically, when the transistor stage 46 is turned on (once per heart beat), it causes the timing capacitor 45 in the pulse generating circuitry to stop charging and to be reset, as noted above, to a condition wherein its charge is equalized through resistor 44, the primary of the output transformer 12, and transistor 46. This zero or equalized charge condition at the timing capacitor 45 is preselected to correspond to a timing condition equivalent to 500 milliseconds before normal generation by the pacer pulse generator of an output heart stimulating pulse. Since, as noted earlier, the control transistor stage 46 is also maintained in its conducting or turned on condition for a preselected 500 millisecond time interval after the occurrence of an R-wave, the pulse generator 40–41 is controlled to not generate an output pulse until a total of approximately 1000 milliseconds or one full second elapses after a normal or unpaced heart beat is detected. In this manner, the pacer is inhibited as long as the heart is beating normally at more than approximately 60 beats per minute. In this sense, therefore, the portion of the illustrated circuitry designated as the rate enhancement circuit also functions to produce a hysteresis or lag whereby the pacer delays the generation of its output heart stimulating pulse, after a normal output beat from the heart has been detected, to see if the heart will again beat normally at a rate equal to or greater than 60 beats per minute. In other words, at the end of the 500 millisecond conduction period for transistor 46, the charging capacitor 45 is released and begins to charge through the primary of the output transformer 12 and resistors 42 and 44. If the heart now fails to generate another output beat signal within the subsequent 500 milliseconds time interval it takes capacitor 45 to charge to the turn on level for transistor 40, transistor 40 will be turned on to initiate generation of an output heart stimulating pulse from the pacer. In this manner, the pacer will generate its normal 72 pulses per minute output whenever the normal heart rate drops below the 60 beats per minute level.

Each pulse appearing at the output of transformer 12 turns on the bipolar transistor switch 49–50 which connects the pulse via wires 48 and 22 to catheter. Between pulses the bipolar transistor switch 49–50 is open, as previously noted, and keeps the secondary of the transformer 12 from acting as an attenuating shunt on the R-waves detected by the catheter. Also, by eliminating the low resistance D.C. path between the electrodes 54 and 55 of the catheter 21, any corrosion current which might flow between 54 and 55 (if, for example, 54 and 55 were composed of different metals) would be eliminated.

Whenever an output heart stimulating pulse is generated by the transistor pair 40–41, as previously described, a portion of it is detected in the pathway wire 48 through capacitor 59 and turns on one-shots 61–63 and 65–66. However, the output pulse is also coupled through RC circuit 78–79 and along wire 80 to the base of transistor stage 81 where it is effective to turn on this transistor stage. Transistor 65 acts as a short and prevents the pulse coming from capacitor 71 from turning on transistor 81. Because of the transit time through transistors 56, 57, 58, 61, 62, 63, 64, 65 and 66, transistor 81 is turned on prior to transistor 66. For silicon transistors, transistor 81 is turned on approximately 40 microseconds prior to transistor 66. As a result, the capacitor 71 in the differentiating circuit described hereinabove is charged in less than 1 millisecond when stage 66 is turned on, and remains charged when stage 81 turns off. Therefore, when the patient's heart subsequently beats in response to this output heart stimulating pulse and this same beat is detected or monitored by the pacer circuitry, the pulse which appears at the collector of transistor stage 66 to demarcate the occurrence of this heart beat will not be differentiated and therefore is ineffective to cause conduction of transistor stage 73. As a result, the paced heart beat; i.e., that produced in response to the application of a heart stimulating pulse, is not registered beyond the collector of transistor stage 66 and therefore will not be confused with a natural heart beat.

Referring to FIG. 1a, a magnetic reed switch or the like 82 is operably connected between the base of transistor stage 75 and the negative terminal of the battery 19 and is capable of being controlled, in a manner well known to those skilled in the art, between opened and closed positions by a suitable external magnetic field source (not shown). This reed switch 82, when remotely controlled to its closed condition, prevents transistor stage 75 and therefore also transistor stage 46 from being turned on. As a result, the illustrated pacer circuitry can be converted from a demand inhibited mode of operation to a fixed rate mode of operation wherein the pulse generating circuitry continuously applies its output heart stimulating pulses to the patient's heart at the preselected 72 pulses per minute rate.

As noted earlier, the present invention also has application to tissue stimulators other than cardiac pacers;

e.g., for brain tissue stimulation. More particularly, the pulse length for cerebellar stimulation would be very similar to that which is used for cardiac pacing, i.e., the pulse duration is approximately 1 millisecond. Also, the time between recharging periods and construction materials for a rechargeable brain stimulator are essentially the same as those which would be used for rechargable cardiac pacers. A brain stimulator would differ from a cardiac pacer in that the pulse repetition rate could be from 10 pulses per second to as much as 200 pulses per second, where the rate for heart stimulation is approximately 1 pulse per second. Furthermore, heart stimulation is typically accomplished with a pulse of 10 ma into a single electrode pair. For brain stimulation, multiple electrodes are used, (typically four to eight pairs) each of which provides approximately 2 ma of stimulating current.

Various other modifications, adaptations and alterations are of course possible in light of the above teachings. Therefore, it should be understood at this time that within the scope of the appended claims the invention may be practiced otherwise than as specifically described.

What is claimed is:

1. In a cardiac pacer and tissue stimulator adapted to be implanted in a patient's body and including a rechargeable battery, means for coupling alternating magnetic input recharging energy to said battery from an external source, and electronic circuit means powered by said battery for generating stimulating pulses for application to the patient's heart or other tissue, the improvement comprising,
    a first inner shield means disposed to shield said circuit means from said external source of alternating magnetic input recharging energy and sources of magnetic interference,
    said coupling means being disposed external to said first shield means, and
    a second outer shield means encompassing said coupling means, said battery, said first shield means and said electronic circuit means to form a hermetic shield against body fluids without substantially attenuating the recharging energy being coupled by said coupling means to said battery from said external source.

2. The cardiac pacer and tissue stimulator specified in claim 1 wherein said first shield means encompasses said electronic circuit means to form a second hermetic seal within the hermetic seal formed by said second outer shield means.

3. The cardiac pacer and tissue stimulator specified in claim 1 wherein said first inner shield means is constructed of a material characterized by relatively high magnetic permeablity and low electrical resistivity and said second outer shield means is constructed of a material characterized by relatively high electrical resistivity and low magnetic permeability.

4. The cardiac pacer and tissue stimulator specified in claim 3 wherein said first inner shield means is fabricated of nickel having a thickness greater than substantially 5 mils.

5. The cardiac pacer and tissue stimulator specified in claim 3 wherein said second outer shield means is fabricated of stainless steel having a thickness substantially within the range 3 to 20 mils.

6. The cardiac pacer and tissue stimulator specified in claim 3 wherein said second outer shield means is fabricated of titanium having a thickness substantially within the range 3 to 20 mils.

7. The cardiac pacer and tissue stimulator specified in claim 3 wherein said second outer shield means is fabricated of Haynes 25 alloy having a thickness substantially within the range 3 to 20 mils.

8. The cardiac pacer and tissue stimulator specified in claim 3 wherein said second outer shield means is glass.

9. The cardiac pacer and tissue stimulator specified in claim 3 wherein said second outer shield means is ceramic.

10. The cardiac pacer and tissue stimulator specified in claim 1 wherein said coupling means is an inductive coupling means.

11. The cardiac pacer and tissue stimulator specified in claim 10 wherein said inductive coupling means comprises a first winding means disposed within the patient's body and adapted to inductively couple energy from said external source to said battery in order to recharge said battery.

12. The apparatus specified in claim 1 wherein said cardiac pacer is of the demand inhibited type including means for monitoring the heart beat of the patient and inhibiting said electronic circuit means in order to prevent the generation thereby of said heart stimulating pulse when said heart is beating naturally at an acceptable rate without application of said heart stimulating pulses.

13. The rechargeable demand inhibited cardiac pacer specified in claim 12 further including a coaxial catheter means having one end connected to said monitoring means and said electronic circuit means, and terminating at its opposite end in a pair of electrodes adapted to be disposed at a preselected location in the patient's heart for applying the heart stimulating pulses generated by said electronic circuit means and for sensing the electrical R-wave signal emanating from the patient's heart when the heart beats.

14. The cardiac pacer and tissue stimulator specified in claim 1 wherein,
    said first shield means is a substantially rectangular hollow metallic can having one end open to receive and have encapsulated therein said electronic circuit means,
    said second shield means is a substantially rectangular hollow metallic can having one end open to receive and have encapsulated therein, said rechargeable battery, said coupling means and said first metallic can, and further including
    a unitary end cap member attached to and covering the open end of each of said first and second can members.

15. The cardiac pacer and tissue stimulator specified in claim 14 wherein said end cap member is formed with first and second shoulder means mating with and sealing respectively the open end of said first and second metallic cans.

16. In a cardiac pacer and tissue stimulator adapted to be implanted in the body of a patient and including a rechargeable battery, means for coupling alternating magnetic input recharging energy to said battery from an external source, and electronic circuit means powered by said battery for generating stimulating pulses and applying them to the patient's heart or other tissue, the improvement comprising, telemetry means rendered effective when recharging energy is being coupled to said battery for providing an indication external of the patient's body that said recharging is taking place, said telemetry means including a means operably connected to said coupling means to receive operating energy only during recharging of said battery for generating an output telemetry signal indicative that recharging of said battery is taking place, said output telemetry signal generating means being responsive to the magnitude of recharging current being applied to said battery to cause the output telemetry signal to indicate whether or not said battery is being recharged at an acceptable recharging current level.

17. The apparatus specified in claim 16 wherein said cardiac pacer is a demand inhibited type further including means for monitoring the beating of the patient's heart for inhibiting said electronic pulse generating circuit means when said heart is beating naturally without the application of said stimulating pulse.

18. The cardiac pacer and tissue stimulator specified in claim 16 wherein the generating means included in said telemetry means is an electrical signal generating means rendered effective only when recharging of said battery is taking place to generate an output electrical telemetry signal capable of being received external of the patient's body.

19. The cardiac pacer and tissue stimulator specified in claim 18 wherein said coupling means is an inductive coupling means comprising a core member and first and second winding means wound on said core member, said first winding inductively coupling energy from said external source to said battery in order to recharge said battery and wherein the output electrical telemetry signal from said signal generating means is connected to said second winding means on said core member for inductive coupling to receiving means external of the patient's body.

20. The cardiac pacer and tissue stimulator specified in claim 16 wherein the generating means included in said telemetry means is an oscillator circuit means whose output signal frequency is proportional to the magnitude of recharging current being applied to said battery, said output frequency signal from said oscillator means being connected to said coupling means for transfer external of the patient's body.

21. The cardiac pacer and tissue stimulator specified in claim 16 further including
first shield means disposed to shield both said electronic circuit means and said telemetry signal generating means from said atternating magnetic input recharging energy and sources of magnetic interference,
said coupling means being disposed external to said first shield means, and
second shield means surrounding said first shield means, said electronic circuit means, said telemetry signal generating means, and said coupling means to form an outer hermetic seal for said pacer or stimulator without substantially attenuating the recharging energy being coupled by said coupling means to said battery from said external source.

22. The cardiac pacer and tissue stimulator specified in claim 21 wherein said first sheild means surrounds said electronic circuit means and said telemetry signal generating means to form a second inner hermetic seal for said pacer and stimulator.

23. In a demand inhibited cardiac pacer including a first electronic circuit means for generating output heart stimulating pulses for application to a patient's heart and a second electronic circuit means for monitoring the patient's heart beat and inhibiting the generation by said first electronic circuit means of said heart stimulating pulses in the presence of an acceptable natural heart beat rate, the improvement comprising,
a step-up transformer included in said first electronic pulse generating circuit means and having primary and secondary windings for increasing the amplitude of each heart stimulating pulse prior to application thereof to the patient's heart,
catheter means having one end connected electrically to said second electronic circuit means and connectable electrically to the secondary winding of the step-up transformer of said first electronic pulse generating circuit means and terminating at its opposite end in electrode means adapted to be disposed at a preselected location in the patient's heart for applying the heart stimulating pulses generated by said first electronic circuit means and for sensing the electrical R-wave signal emanating from the patient's heart when the heart beats, and
switching means for selectively connecting the secondary winding of the step-up transformer of said electronic pulse generating circuit means to said catheter means only when an output pulse is being generated by said pulse generating circuit means.

24. The demand inhibited cardiac pacer specified in claim 23 wherein said catheter means is a coaxial catheter and further including,
a rechargeable battery for supplying operating voltage to said first and second electronic circuit means, and
means for inductively coupling alternating magnetic recharging energy to said battery from an external source.

25. The rechargeable demand inhibited cardiac pacer specified in claim 24 further including,
telemetry signal generating means connected to said inductive coupling means to receive operating power only during recharging of said battery for generating an output telemetry signal indicative that recharging of said battery is taking place, said output telemetry signal being connected to said inductive coupling means to be inductively coupled external of the patient's body,
first shield means disposed to shield both of said first and second electronic circuit means and said telemetry signal generating means from said alternating magnetic input recharging energy and sources of magnetic interference, and
second shield means surrounding said first shield means, said first and second electronic circuit means, said telemetry signal generating means, and said inductive coupling means to form an outer hermetic seal for said pacer without substantially attenuating the recharging energy being coupled by said coupling means to said battery from said external source, said second shield means being constructed of a material effective to permit the coupling of recharging energy by said coupling means to said battery from said external source without substantial attenuation.

26. The rechargeable demand inhibited cardiac pacer specified in claim 25 wherein, said telemetry signal generating means is an oscillator circuit means operably connected to said inductive coupling means to receive operating voltage only during recharging of said battery for generating an output electrical signal whose existence provides an indication that recharging of said battery is taking place and whose frequency is proportional to the magnitude of recharging current being applied to said battery, said output frequency signal from said oscillator means being connected to said inductive coupling means to be inductively coupled external of the patient's body, and said first shield means surrounds said first and second electronic circuit means and said oscillator means to form a second inner hermetic seal for said pacer unit.

27. The demand inhibited cardiac pacer specified in claim 26 wherein said switching means comprises a bipolar transistor switching gate circuit connected electrically between said catheter means and the secondary winding of the step-up transformer of said pulse generating circuit means, said switching gate including transistor means rendered conductive by an output heart stimulating pulse from said pulse generating circuit means to said pulse generating circuit means only when an output heart stimulating pulse is being generated by said pulse generating circuit means.

28. The demand inhibited cardiac pacer specified in claim 23 wherein said switching means comprises a bipolar transistor switching gate circuit connected electrically between the secondary winding of said output transformer and said catheter means, said switching gate including transistor means rendered conductive by an output heart stimulating pulse from said pulse generating circuit means to connect said catheter means to said output transformer only when an output heart stimulating pulse is being generated by said pulse generating circuit means and appears at the secondary winding of said output transformer.

29. The rechargeable demand inhibited cardiac pacer specified in claim 23 wherein said second electronic circuit means includes circuit means to prevent said first electronic circuit means from being inhibited by R-wave signals occurring at greater than a predetermined rate corresponding to a predetermined maximum acceptable natural heart rate.

* * * * *